Dec. 19, 1961     P. D. RIGTERINK     3,013,401
AIR FOG COOLING SYSTEM
Filed April 27, 1959
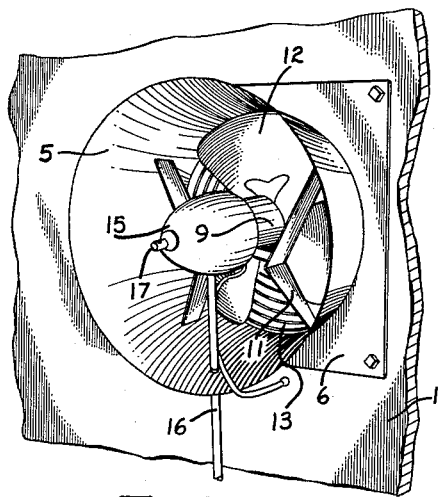
Fig. 1
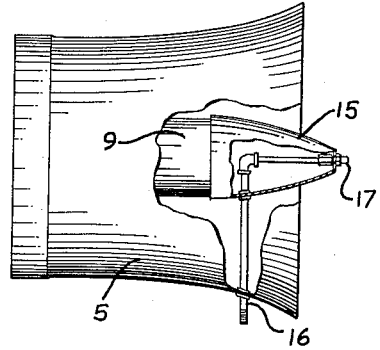
Fig. 2
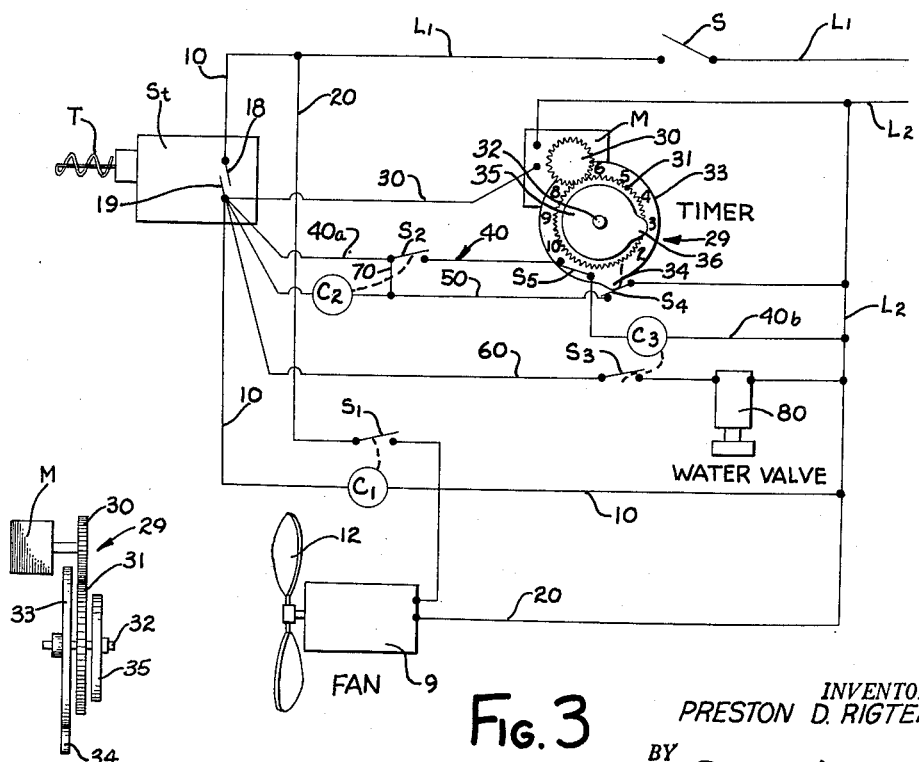
Fig. 3
Fig. 4
INVENTOR.
PRESTON D. RIGTERINK
BY
Price and Heneveld
ATTORNEYS

United States Patent Office 3,013,401
Patented Dec. 19, 1961

3,013,401
AIR FOG COOLING SYSTEM
Preston D. Rigterink, Holland, Mich., assignor to Automatic Poultry Feeder Company, Zeeland, Mich., a corporation of Michigan
Filed Apr. 27, 1959, Ser. No. 809,297
8 Claims. (Cl. 62—157)

This invention relates to an air fog cooling system. More particularly, this invention relates to a method and apparatus for cooling an animal enclosure and the animals therein. This invention is especially well adapted to be used when the necessity exists for cooling a poultry house, particularly chickens.

In many instances, the necessity for cooling animals within an enclosure arises. This is particularly true with respect to laying hens. During very warm weather the productivity of a group of laying hens tends to decline. The number of eggs produced may decline sharply if the temperature within the enclosure is very high, as often occurs even in the northern part of the country during the summer months. However, this is not only true with respect to chickens. Therefore, the concepts of this invention might be utilized to cool any type of animal enclosure.

The most common way to cool an animal enclosure is by means of a fan positioned to circulate air within the enclosure. However, such a cooling apparatus is quite ineffective when the temperatures are above normal. The mere passage of warm air around the animals has little cooling effect. Consequently, no cooling apparatus has been developed up to this time which serves to keep the animals within an enclosure comfortably cool when the temperature within the enclosure rises.

It is an object of this invention to provide a method of cooling an enclosure and the animals therein which is much more effective than anything devised heretofore.

It is also an object of this invention to provide an apparatus for cooling an enclosure and the animals therein. This apparatus is especially well adapted to be used to cool a chicken house. Upon keeping the chickens relatively cool when the temperature within the enclosure rises, productivity will increase and the birds themselves remain in healthier condition.

Another object of this invention is to provide such a cooling system which is completely automatic in operation and continuously works to cool the enclosure and the animals therein.

Still another object of this invention is to provide such an apparatus which is simple in construction and may be quickly and easily installed into most types of enclosures.

Other objects of this invention will become obvious to those skilled in the art of cooling systems upon reading the following specification in conjunction with the accompanying drawings, wherein:

FIG. 1 is a perspective view of the air fog cooling apparatus comprising this invention as viewed from the outside of the enclosure.

FIG. 2 is a side view of this air fog cooling apparatus, certain parts thereof being broken away to better show the invention.

FIG. 3 is a wiring diagram of the control circuit for the system of this invention.

FIG. 4 is a side view of the timing apparatus shown in FIG. 3.

Briefly, this invention relates to a method of cooling an enclosure and the animals therein consisting of the steps of simultaneously circulating the air within the enclosure and around the animals therein and injecting a fine spray of water mist into the enclosure and on the animals therein. The injection of water mist into the enclosure and on the animals therein is stopped after a predetermined time. The circulation of air within the enclosure and around the animals therein is continued until the enclosure and the animals therein are sufficiently cooled, the water mist having substantially evaporated away due to the circulation.

This invention also relates to an apparatus for cooling an enclosure and the animals therein, the apparatus including a fan positioned to circulate air in the enclosure, a thermo-responsive means for controlling the operation of the fan and a means for injecting a fine spray of water mist into the enclosure and on the animals therein. The thermo-responsive means is located within the enclosure and subject to the temperature therein. In a preferred embodiment of this invention, the thermo-responsive means dominates the energizing circuit for the motor which operates the fan. The thermo-responsive means is effective to close the motor energizing circuit when the temperature within the enclosure rises above a first predetermined value. A time clock is provided, the energizing circuit of which is dominated by the thermo-responsive means and closed for a predetermined time when the temperature in the enclosure is above the first predetermined value. The fan is positioned in a window of the enclosure, the fan being of a type drawing air therein. A water supply conduit is positioned at the intake side of this fan, a nozzle adapted to emit a fine spray at the end thereof. As a fine spray of water mist emits from this nozzle, it is drawn through the fan and circulates within the housing and on the animals therein. An electrically operated water valve determines when water emits from this nozzle. The energizing circuit for this water valve is dominated by the time clock, whereby the valve allows a flow of water through the conduit for the predetermined time of operation of the time clock. When the enclosure and the animals therein have thus been subjected to this fine spray of water mist, the fan continues in operation until the thermo-responsive means reopens the motor energizing circuit when the temperature in the enclosure drops below a second predetermined value.

Turning more specifically to the drawings, the reference numeral 1 designates a wall of an animal enclosure. The housing 5 is adapted to be mounted within an opening in the enclosure by means of the panel 6 in which the housing is mounted. Thus, the panel 6 may be mounted in the window of an enclosure, the entire cooling system being mounted within a very small space.

The fan motor 9 is mounted within the housing 5 by means of the bracelet 11. The fan 12 is pitched to draw air from the outside of the enclosure and circulate it within the enclosure. The fan guard 13 is positioned at the front of the fan 12 within the housing 5 towards the inside of the enclosure.

Secured to the fan motor 9 is the spray nozzle cone 15. The cone 15 supports the water conduit 16, the conduit extending through the bottom of the housing 5, through the bottom of the cone 15 and extending from the apex thereof. A nozzle 17 of the type adapted to emit a fine spray of water mist is attached to the end of the conduit 16.

FIG. 3 is a circuit diagram showing the operation of the component parts of this cooling apparatus. The lines $L_1$ and $L_2$ lead to a power source (not shown), power being supplied through the off-on line switch S in $L_1$. The thermostat $S_t$ is connected in line 10 between power lines $L_1$ and $L_2$. Thermostat $S_t$ is controlled by the helical shaped bi-metal thermostatic element T, which when heated or cooled will expand or contract to respectively close or open the contacts 18 and 19. Also connected in line 10 between the thermostat $S_t$ and power line $L_2$ is the relay coil $C_1$. This relay solenoid or coil $C_1$ is adapted to close the switch $S_1$ connected in series with fan motor 9 in line 20 which is connected in parallel with line 10 across the power lines $L_1$ and $L_2$.

Lines 30, 40 and 50 are connected across lines 10 and $L_2$ in series with thermostat $S_t$, requiring the contacts 18 and 19 to be closed for current to flow through these lines. Line 30 supplies power to the clock motor M when thermostat $S_t$ is closed. The clock motor M drives the gear 30 of the timing apparatus 29 which in turn drives the gear 31 (FIGS. 3 and 4). Fixed on the shaft 32 passing through the center of the gear 31 are the cam disks 33 and 35, on opposite sides of the gear 31. A cam surface 34 is positioned on the outer periphery of the larger disk 33 and a cam surface 36 is positioned on the outer periphery of the smaller disk 35. Disk 35 may be manually moved, enabling the cam surface 36 to be placed in any number of positions with respect to cam surface 34 (FIG. 3). The operation of this timing apparatus 29 will be more fully described hereinafter.

Line 40 having two sections 40a and 40b supplies power to the relay coil $C_3$. Located in the section 40a is the switch $S_2$ and in the section 40b is the relay coil $C_3$. Between these sections is the switch $S_5$ which is adapted to be actuated by the cam disk 35 of the timer 29.

Line 50 is provided to facilitate a holding circuit comprising the relay coil $C_2$ and the switch $S_2$ connected in series by the jumper line 70 connected between lines 40 and 50. Also located in line 50 is the normally open spring biased switch $S_4$ which is closed only when engaged by the cam element 34 of disk 33.

Line 60 supplies power to the water valve 80. Connected in the line 60 is the relay switch $S_3$ which is controlled by the relay coil $C_3$. As a result, when $S_3$ is closed water is permitted to flow through conduit 16 out of the nozzle 17.

*Operation*

The cooling apparatus described operates as follows. When the helical shaped bi-metal element T is heated by the warm temperature within the animal enclosure, it expands and contacts 18 and 19 of the thermostat $S_t$ are closed. Assuming the off-on line switch S in $L_1$ is also closed, current flows through $L_1$, thermostat $S_t$ and line 30 energizing the motor M and starting the timer 29. Current also flows through line 10 energizing coil $C_1$ which closes the switch $S_1$ in line 20. This fan starts the fan motor 9 and operates the fan 12 which draws fresh air into the enclosure and circulates it therein.

As the clock motor M starts, it rotates the gear 30 of the timing apparatus 29. Cam disk 33 rotates with gear 31 causing the cam surface 34 on disk 33 to momentarily close switch $S_4$ in line 50. This occurs just long enough for the relay coil $C_2$ in line 50 to be energized closing switch $S_2$ in line 40. With relay switch $S_2$ closed and located in series with coil $C_2$, by means of line 70, the coil $C_2$ holds the circuit through coil $C_3$ closed until $S_5$ is opened.

Energization of relay coil $C_3$ closes switch $S_3$ in line 60, thereby opening the solenoid operated, spring return, water valve 80. All of this action takes place simultaneously. In other words, the fan begins operation and water mist is supplied through conduit 16 and nozzle 17 to the intake side of the fan 12. This mist is distributed within the animal enclosure as the fan circulates the air therein.

The amount of time that the water valve 80 stays open is dependent upon the manual setting of disk 35 with respect to disk 33. If cam surface 36 of disk 35 is set opposite the number 3, it will be noted that switch $S_5$ will remain closed for three minutes and then cam surface 36 will open it. When switch $S_5$ is opened, the relay coil $C_2$ and $C_3$ are de-energized and switches $S_2$ and $S_3$ are opened. Since switch $S_4$ was reopened as soon as cam surface 34 of disk 33 started its movement, there is no way that relay coil $C_2$ and $C_3$ can again be energized until the cam surface 34 returns to its starting position and closes switch $S_4$. Therefore, the water valve 80 is closed after a three minute cycle and will not be opened again until the clock has run for its full ten minute cycle. It should now be obvious that the water valve 80 may be opened for a predetermined time, ranging from seconds to the full ten minutes.

Thermostat $S_t$ remains closed until the temperature in the enclosure begins to drop and thermostatic element T contracts sufficiently to open it.

Therefore, when the temperature reaches a certain high value, the fan begins its operation and a water mist is sprayed at the intake side of the fan. The air is circulated within the enclosure and the water mist is also circulated therein and deposited on the animals. The circulating air around the animals with the water mist deposited on them tends to cool them and makes the enclosure much more comfortable. The amount of time that the water mist is injected into the enclosure may be varied. The fan will continue in operation and water may be continuously inserted into the enclosure until the temperature drops and the fan is shut off. The whole cycle will begin once again when the temperature rises above the predetermined high value.

The entire apparatus may be mounted in a window of the animal enclosure and is especially well adapted to be mounted in the window of a chicken house. It has been found that productivity greatly increases when the hens are cooled by this apparatus. It is simple to install and operate. One need merely set the predetermined high and low values at which he wishes the thermostat $S_t$ to be respectively closed and opened. He merely sets the time during which he wishes water mist to be injected into the enclosure. Then the off-on line switch S is turned on. With this apparatus, the user is assured that the animals within the enclosure are kept in a comfortable temperature surrounding at all times.

While only one embodiment of this invention has been described, it may be possible to practice it through certain other embodiments. These other embodiments are to be included within the spirit and scope of this invention unless the following claims expressly state otherwise.

I claim:

1. Apparatus for cooling an enclosure and the animals therein, comprising: a fan positioned to circulate air in the enclosure; thermo-responsive means located within the enclosure and subject to the temperature therein; spray means for injecting a fine spray of water into the enclosure and on the animals therein; and a timer mechanism operatively associated with said spray means for causing said spray means to be operated and subsequently shut off previous to the stopping of the operation of said fan said spray means and timer mechanism being dominated by said thermo-responsive means.

2. Apparatus for cooling an enclosure and the animals therein, comprising: a fan positioned to circulate air in the enclosure; an electric motor connected to drive said fan; an energizing circuit for said motor; thermo-responsive means located within the enclosure and subject to the temperature thereof; said thermo-responsive means dominating said circuit whereby said fan begins operation when the temperature within the enclosure is above a first predetermined value and stops operation when said temperature is below a second predetermined value; spray means for injecting a fine spray of water mist into the enclosure and on the animals therein while said fan is in operation; and a timer mechanism operatively associated with said spray means for causing said spray means to be operated and subsequently shut off previous to the stopping of the operation of said fan.

3. Apparatus for cooling an enclosure and the animals therein, comprising: a fan positioned to circulate air in the enclosure; an electric motor connected to drive said fan; an energizing circuit for said motor; thermo-responsive means located within the enclosure and subject to the temperature thereof; said thermo-responsive means dominating said circuit whereby said fan begins operation when the temperature within the enclosure is above a first predetermined value and stops operation when said temperature is below a second predetermined value; spray means for injecting a fine spray of water mist into the enclosure and on the animals therein while said fan is in operation, said timer mechanism being dominated by said thermo-responsive means.

4. Apparatus for cooling an enclosure and the animals therein, comprising: a fan positioned to circulate air in the enclosure; an electric motor connected to drive said fan; an energizing circuit for said motor; thermo-responsive means dominating said motor energizing circuit, said thermo-responsive means located within the enclosure and subject to the temperature therein; said thermo-responsive means being effective to close said motor energizing circuit when the temperature in the enclosure is above a first predetermined value; spray means for directing a fine spray of water mist within said enclosure and onto the animals; an electrically operated water valve controlling said spray means; an energizing circuit for said water valve, said water valve energizing circuit including a timer mechanism for opening said valve during a predetermined time interval and then closing the same for causing said spray means to direct a fine spray of water mist within said enclosure during said time interval; and said thermo-responsive means being effective to reopen said motor energizing circuit when the temperature in the enclosure drops below a second predetermined value.

5. Apparatus for cooling an enclosure and the animals therein, comprising: a fan positioned to circulate air in the enclosure; an electric motor connected to drive said fan; an energizing circuit for said motor; thermo-responsive means dominating said motor energizing circuit, said thermo-responsive means located within the enclosure and subject to the temperature therein; said thermo-responsive means being effective to close said motor energizing circuit when the temperature in the enclosure is above a first predetermined value; a timing mechanism; an energizing circuit for said timing mechanism; said timing mechanism energizing circuit dominated by said thermo-responsive means and closed for a predetermined time when the temperature in said house is above said first predetermined value; means for directing a fine spray of water mist within said enclosure and onto the animals; an electrically operated water valve controlling said means; an energizing circuit for said water valve, said water valve energizing circuit dominated by said timing mechanism whereby said water valve is open for said predetermined time; and said thermo-responsive means being effective to reopen said motor energizing circuit when the temperature in the enclosure drops below a second predetermined value.

6. Apparatus for cooling an enclosure and the animals therein, comprising: a fan positioned to circulate air in the enclosure; an electric motor connected to drive said fan; an energizing circuit for said motor; thermo-responsive means dominating said motor energizing circuit, said thermo-responsive means located within the enclosure and subject to the temperature therein; said thermo-responsive means being effective to close said motor energizing circuit when the temperature in the enclosure is above a first predetermined value; a timing mechanism; an energizing circuit for said timing mechanism; said timing mechanism energizing circuit dominated by said thermo-responsive means and closed when the temperature in said house is above said first predetermined value; means for directing a fine spray of water mist within said enclosure and onto the animals; an electrically operated water valve controlling said means; an energizing circuit for said water valve, said water valve energizing circuit dominated by said timing mechanism; means for holding said water valve open for a preselected time; and said thermo-responsive means being effective to reopen said motor energizing circuit when the temperature in the enclosure drops below a second predetermined value.

7. Apparatus for cooling an enclosure and the animals therein; comprising: a fan positioned to draw fresh air into the enclosure; an electric motor connected to drive said fan; a water supplying conduit positioned adjacent said fan; a nozzle on said conduit adapted to spray water at the intake side of said fan to be carried into the enclosure thereby; an energizing circuit for said motor; thermo-responsive means dominating said circuit, said thermo-responsive means located within the enclosure and subject to the temperature thereof; said thermo-responsive means being effective to close said motor energizing circuit when the temperature in the enclosure is above a first predetermined value; a time clock; an energizing circuit for said time clock, said time clock energizing circuit dominated by said thermo-responsive means and closed for a predetermined time when the temperature in said enclosure is above said first predetermined value; an electrically operated water valve in said conduit; an energizing circuit for said water valve, said circuit dominated by said time clock whereby said valve allows a flow of water through said conduit for said predetermined time; and said thermo-responsive means being effective to reopen said motor energizing circuit when the temperature in the enclosure drops below a second predetermined value.

8. Apparatus for cooling an enclosure and the animals therein, comprising: a fan positioned to draw fresh air into the enclosure; an electric motor connected to drive said fan; a water supplying conduit positioned adjacent said fan; a nozzle on said conduit adapted to spray water at the intake side of said fan to be carried into the enclosure thereby; an energizing circuit for said motor; thermo-responsive means dominating said circuit, said thermo-responsive means located within the enclosure and subject to the temperature thereof; said thermo-responsive means being effective to close said motor energizing circuit when the temperature in the enclosure is above a first predetermined value; a time clock; an energizing circuit for said time clock, said time clock energizing circuit dominated by said thermo-responsive means and closed when the temperature in said enclosure is above said first predetermined value; an electrically operated water valve in said conduit; an energizing circuit for said water valve, said circuit dominated by said time clock; means whereby said valve allows a flow of water through said conduit for a preselected time; and said thermo-responsive means being effective to reopen said motor energizing circuit when the temperature in the enclosure drops below a second predetermined value.

References Cited in the file of this patent

UNITED STATES PATENTS

| | | |
|---|---|---|
| 2,157,329 | Fillo | May 9, 1939 |
| 2,342,841 | Carraway | Feb. 29, 1944 |
| 2,343,959 | Cummings | Mar. 14, 1944 |
| 2,533,913 | Booth | Dec. 12, 1950 |
| 2,751,882 | Coyner | June 26, 1956 |
| 2,835,476 | Kohut | May 20, 1958 |